United States Patent
Wong et al.

(10) Patent No.: US 7,110,628 B2
(45) Date of Patent: Sep. 19, 2006

(54) RECONFIGURABLE MICROPHOTONICS DEVICES VIA DEFORMABLE MEMBRANE PLATFORMS

(75) Inventors: Chee Wei Wong, Cambridge, MA (US); George Barbastathis, Boston, MA (US); Sang-Gook Kim, Wayland, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/619,203

(22) Filed: Jul. 14, 2003

(65) Prior Publication Data

US 2004/0076361 A1   Apr. 22, 2004

Related U.S. Application Data

(60) Provisional application No. 60/395,932, filed on Jul. 12, 2002.

(51) Int. Cl.
*G02B 6/12* (2006.01)
*G02B 6/10* (2006.01)

(52) U.S. Cl. .......................... 385/14; 385/129

(58) Field of Classification Search ............... 385/1, 385/2, 4, 8, 9, 14, 39, 40, 122, 129–132
See application file for complete search history.

(56) References Cited

U.S. PATENT DOCUMENTS

| 5,313,535 | A  | * | 5/1994 | Williams ................... 385/14 |
| 6,445,838 | B1 | * | 9/2002 | Caracci et al. ............. 385/14 |
| 6,751,368 | B1 | * | 6/2004 | Lim et al. ................... 385/14 |
| 2002/0021878 | A1 | * | 2/2002 | Allan et al. ................ 385/129 |
| 2002/0054424 | A1 |   | 5/2002 | Miles |
| 2004/0008942 | A1 | * | 1/2004 | Scheuer et al. ............. 385/39 |

FOREIGN PATENT DOCUMENTS

| WO | WO 02/10843 | 2/2002 |
| WO | WO 02/25338 | 3/2002 |

OTHER PUBLICATIONS

"Photonic-bandgap microcavities in optical waveguides," Foresi et al. *Nature*. Nov. 1997. vol. 390.

* cited by examiner

*Primary Examiner*—Juliana Kang
(74) *Attorney, Agent, or Firm*—Gauthier & Connors LLP

(57) ABSTRACT

A microphotonic device is provided. The microphotonic device includes a membrane structure that can experience strain. A waveguide element is formed on the membrane structure so that when the membrane structure is strained, the waveguide element elements are tuned to a selective amount.

20 Claims, 6 Drawing Sheets

RECONFIGURABLE MICROPHOTONICS DEVICES VIA DEFORMABLE MEMBRANE PLATFORMS

PRIORITY INFORMATION

This application claims priority from provisional application Ser. No. 60/395,932 filed Jul. 12, 2002, which is incorporated herein by reference in its entirety.

BACKGROUND OF THE INVENTION

The invention relates to the field of microphotonics, and in particular to reconfigurable microphotonic devices via a deformable membrane platform.

The vast majority of microphotonic devices possess a wide spectrum of applications. Most of these devices are static devices, where reconfiguration is not possible after device fabrication. To achieve tuning of microphotonic devices, the electro-optic effect, the charge-carrier effect (via temperature and/or doping) and the liquid crystal tuning methods have been reported. There is a need in the art to provide tunability in silicon microphotonics, given the absence of electro-optic effect in silicon. Our invention also permits low-power actuation, a response time on the order of $10^{-5}$ sec, and fine-resolution control of the tuning.

SUMMARY OF THE INVENTION

According to one aspect of the invention, there is provided a microphotonic device. The microphotonic device includes a membrane structure that can experience strain. A waveguide element is formed on the membrane structure so that when the membrane structure is strained, the waveguide elements are tuned to a selective amount.

According to another aspect of the invention, there is provided a method of forming a microphotonic device. The method includes providing a membrane structure that can experience strain. Also, the method includes forming a waveguide element on the membrane structure so that when the membrane structure is strained the waveguide element is tuned to a selective amount.

DETAILED DESCRIPTION OF THE INVENTION

The invention uses a novel concept of tuning microphotonic devices via mechanical deformation. A microphotonic structure, such as a microring resonator, a photonic crystal, or similar derivatives can be superimposed onto a thin sub-micron deformable membrane. The controlled deformation of the membrane will allow the geometrical structure to be tuned up to the order of 0.2% strain. Correspondingly, optical properties of the microphotonic structure, such as resonance in the bandgap of the transmission spectra, the size of the bandgap, the quality factor Q of a quantum electrodynamics cavity, and other properties can also be tuned. Fine control of the membrane deformation will allow fine-tuning of these optical properties.

This invention will also allow for dynamic tuning of these properties, either in part of the device function, in response to fabrication deviations, or to external disturbances. Real-time reconfigurability of the microphotonic structures can be achieved. This invention uses the concept of deformable membrane actuation to mechanically tune microphotonic structures.

Figure 1A:
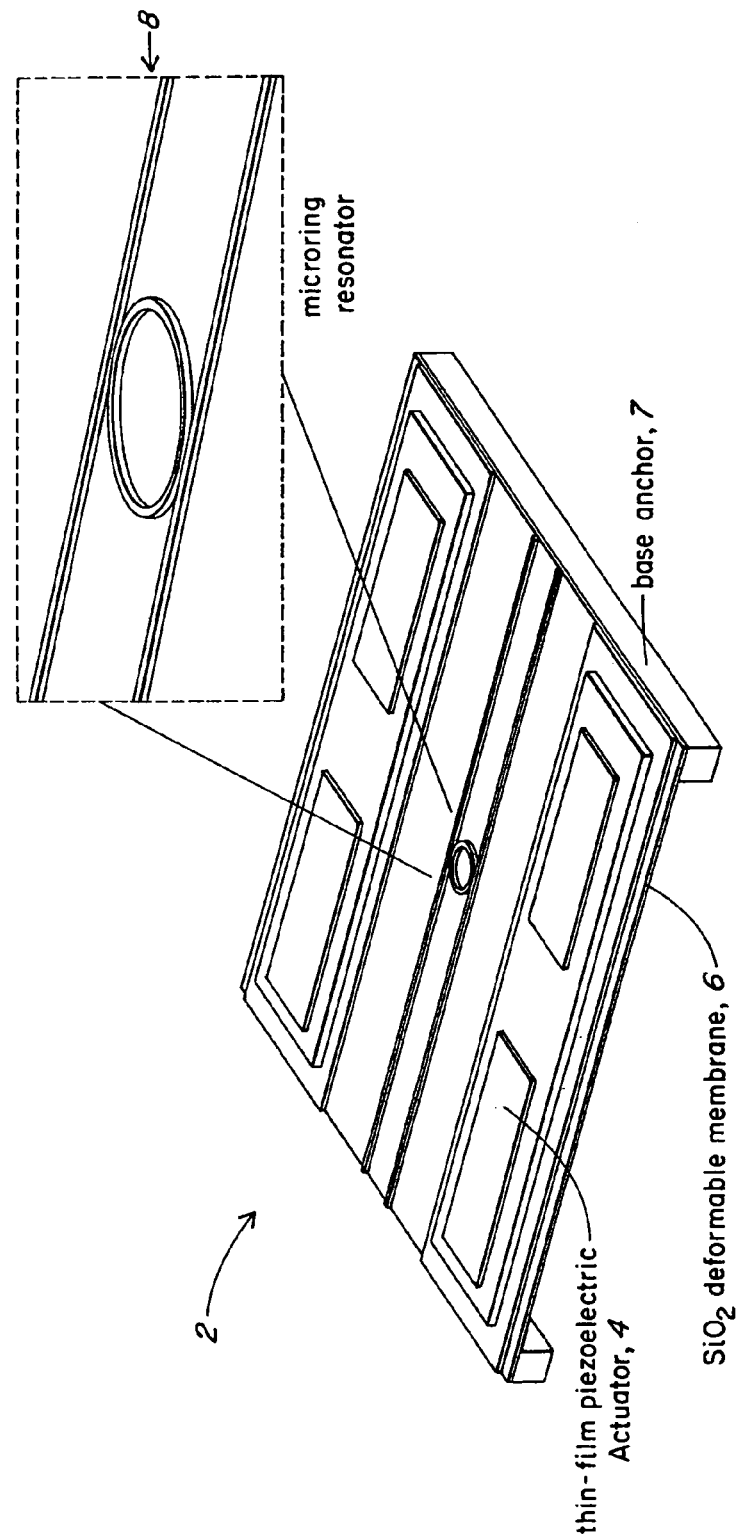
FIG. 1A is a schematic diagram of a microring resonator implemented on top of a membrane.

FIG. 1A shows a microring structure 2 that is formed on a membrane 6 supported by base anchors 7. The thin-film membrane 6, sub-micron in size and on the order of 200–400 nm, is deformed through thin-film piezoelectric actuators 4, such as lead zirconate titanate (PZT), poly-vinylidene fluoride (PVDF), zinc oxide, quartz or aluminum nitride. With the mechanical strain through the piezoelectric actuators 4 that has the high power density on the order of 1000 W/kg, the piezoelectric actuators 4 provides a possible and experimentally measured strain of approximately 0.2% on the membrane. With a superimposed microphotonic device structure, this 0.2% tunability in the structure results in changes in its optical response. The base anchor 7 on both sides of the membrane provides the fixed-fixed boundary supports to the deformable membrane.

For a photonic crystal bandgap with a defect, such as in a 1-dimensional photonic crystal microcavity waveguide, this mechanical strain creates a 0.56% change in the resonant frequency in the transmission bandgap from modified perturbation theory computations. For a 2-dimensional photonic structure, the membrane can be designed to limit the strain at the line defect.

The maximum amount of deformation will be limited by the strain limit of the membrane and the actuators. For lead zirconate titanate (PZT) piezoelectric actuators, the actuator strain limit could reach up to 0.1% and provide a membrane strain on the order of 0.2%. The membrane is a thin sub-micron silicon oxide ($SiO_2$) layer to provide mechanical support for the microphotonic structure, while providing high dielectric contrast with air underneath the membrane. A suggested thickness of 200 nm is designed under mechanical robustness constraints. If the microphotonic structure is continuous in the strain direction, the strain limit of the microphotonic structure is highly dependent on the surface roughness of the material; a silicon material with surface roughness below 20 nm is expected to have fracture stresses on the order of 1 GPa, corresponding to a strain limit of 0.7%. The device strain limit is dependent on the detailed microfabrication process, dependent on the geometrical shape of the structure in introducing stress concentration regions, and expressed as a probability distribution function through Weibull statistic. The strain of 0.2% to 0.3% for the silicon devices in our invention is a safe estimate.

Figure 1B:
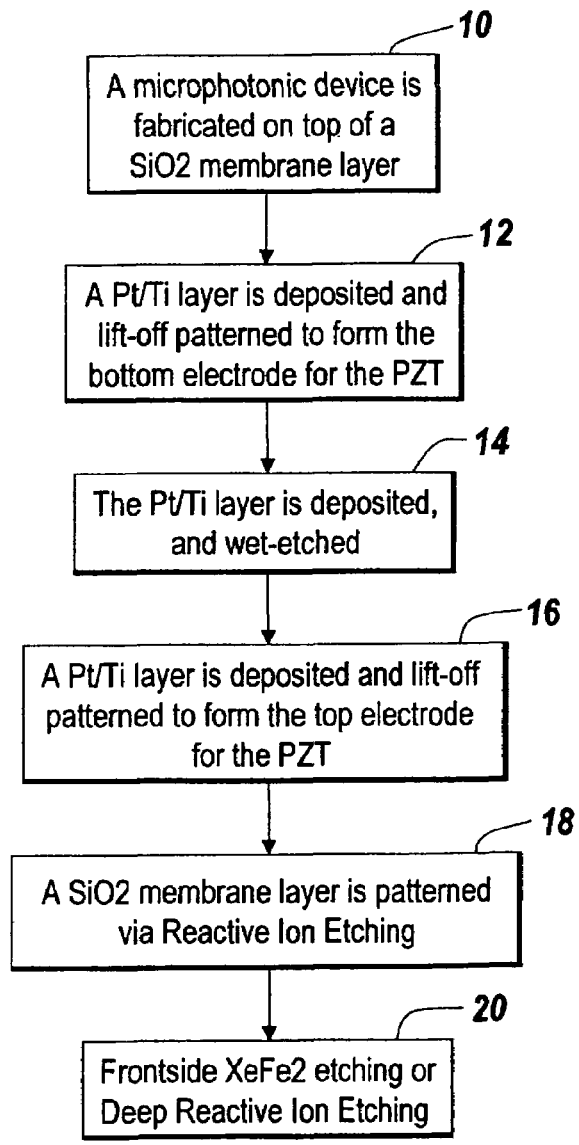
FIG. 1B is a flowchart demonstrating how to fabricate the microring resonator.

The steps of fabricating the inventive microring device are shown in FIG. 1B. A microphotonic device is fabricated on top of a $SiO_2$ membrane layer (step 10). A Pt/Ti layer is deposited and lift-off patterned to from the bottom electrode for the PZT (step 12). The thin-film PZT is deposited, annealed, and wet etched (step 14). A Pt/Ti layer is deposited and lift-off patterned to form the top electrode for the PZT (step 16). A $SiO_2$ membrane layer is patterned via Reactive Ion Etching (step 18). Frontside $XeF_2$ etching or backside Deep Reactive Ion Etching is used to remove bulk Si substrate to free the membrane (step 20).

Step 10 is a lumped fabrication step to create a microphotonics device and depends on the exact device. Steps 12–16 create the active piezoelectric actuators. Steps 18–20 create the doubly-anchored deformable membrane platform for microphotonics devices.

Microring resonators have applications in channel dropping filters and can be made compact for high-density integration and low loss through high dielectric contrast waveguides. By applying a mechanical strain on the microring resonator, the optical path length of the microring is changed, resulting in tunability of the resonant mode.

Figure 2:
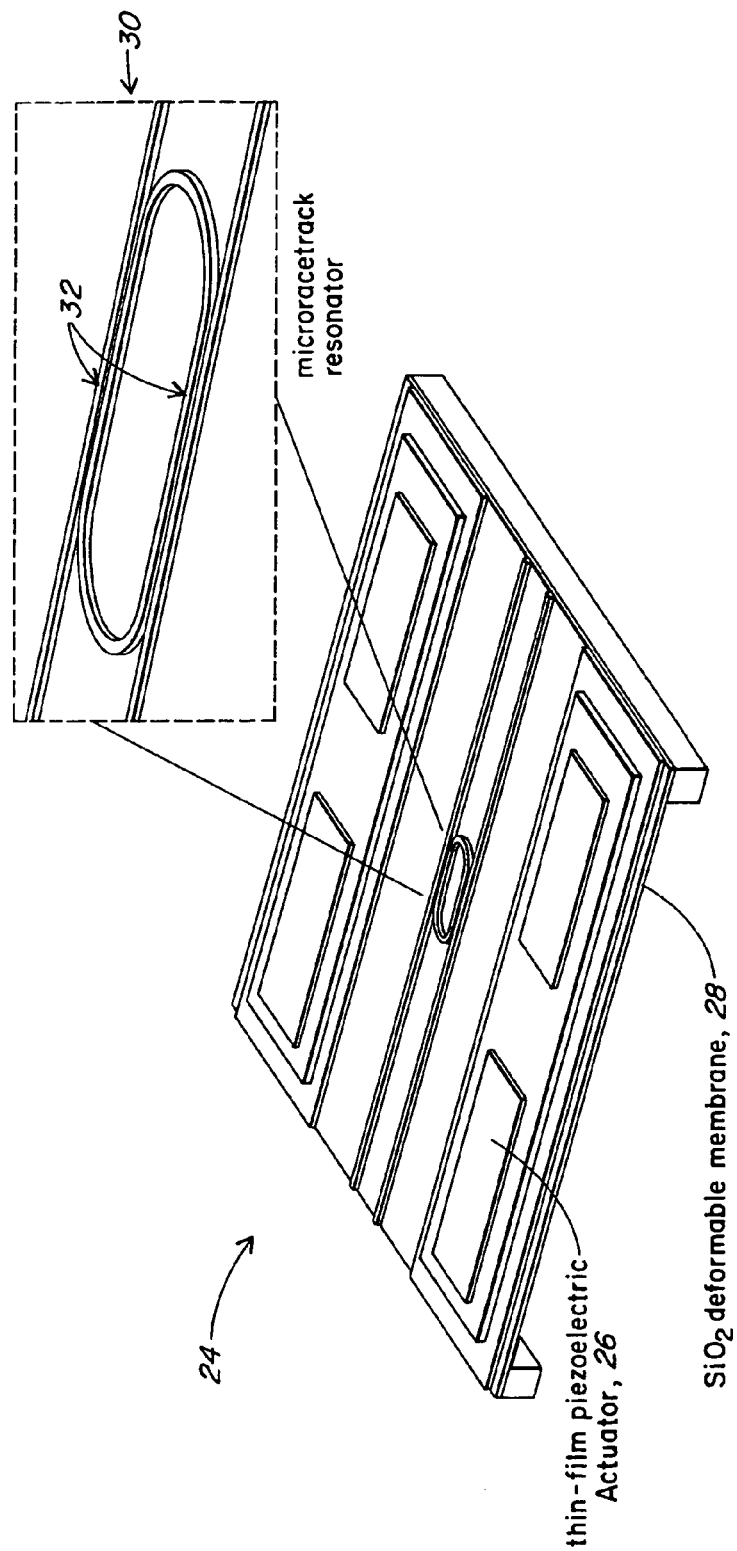
FIG. 2 is a schematic diagram of a microracetrack resonator implemented on top of a membrane.

In a second embodiment of the invention, a microphotonic structure 24 includes a microracetrack resonator 30 that is implemented on top of a membrane 28, as shown in FIG. 2. With identical applications to the microring resonator 8 shown in FIG. 1A, the microracetrack resonator 30 allow for more efficient coupling because the straight length 32 of the racetrack 30 allow for exact phase-matching between the input/output waveguides and the microphotonic structure 24. By applying a mechanical strain on the microracetrack resonator 30, the optical path length of the microracetrack resonator 30 is changed, resulting in tunability of the resonant mode. Furthermore, the techniques for fabricating the microphotonic structure 24 is the same steps for fabricating the microphotonic structure 2, as discussed for FIG. 1B, except the dimensions of the microracetrack resonator 30 will be different than that of the microring structure 8 discussed in FIG. 1A.

Figure 3:
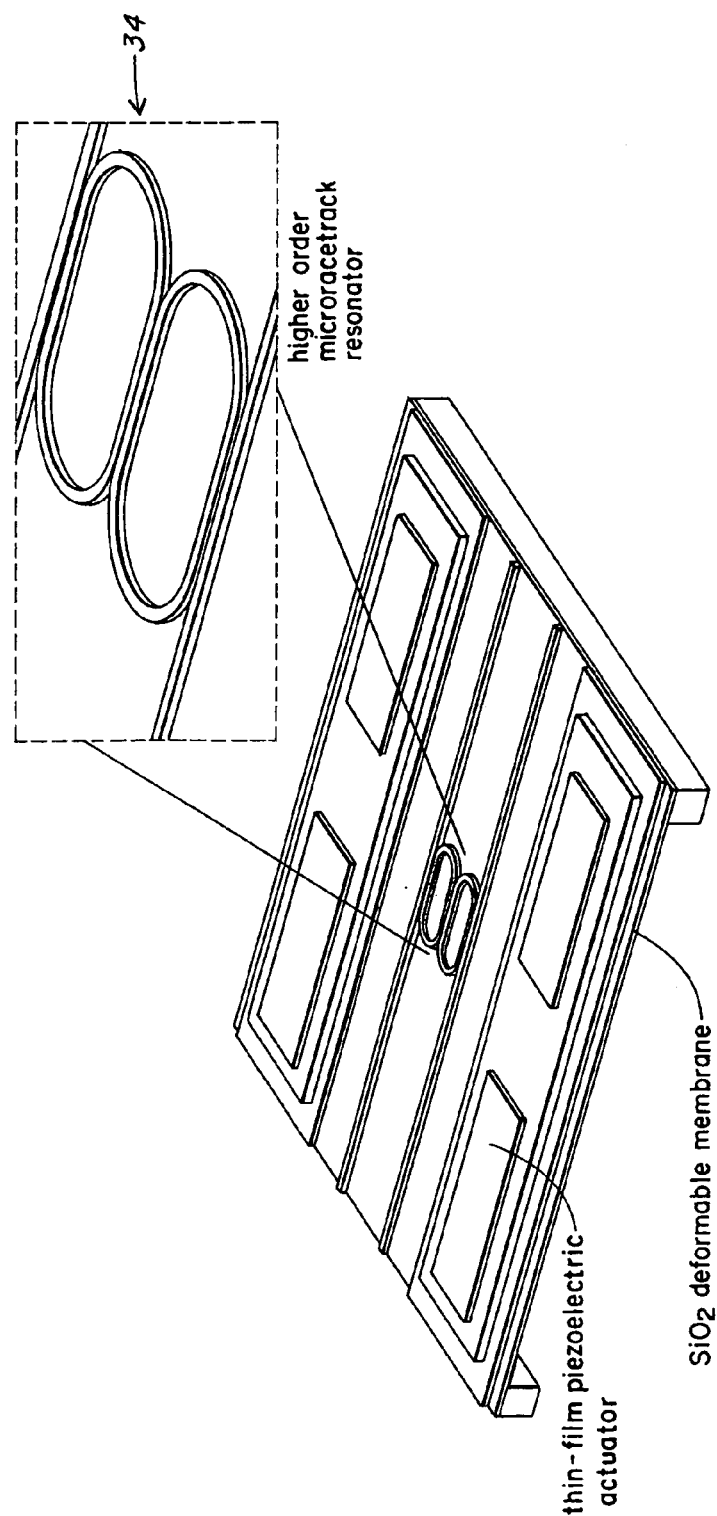
FIG. 3 is a schematic diagram of a higher order microracetrack resonator implemented on top of a membrane.

Tuning of a microracetrack resonator via mechanical deformable membranes is especially useful for higher order filters, as shown in FIG. 3, where virtually identical resonances are necessary for acceptable efficiencies in the higher order filters 34. Via mechanical deformation, as opposed to thermal tuning, localized tuning of individual resonators is now possible. Higher response times and lower voltage requirements are also essential benefits.

Figure 4:
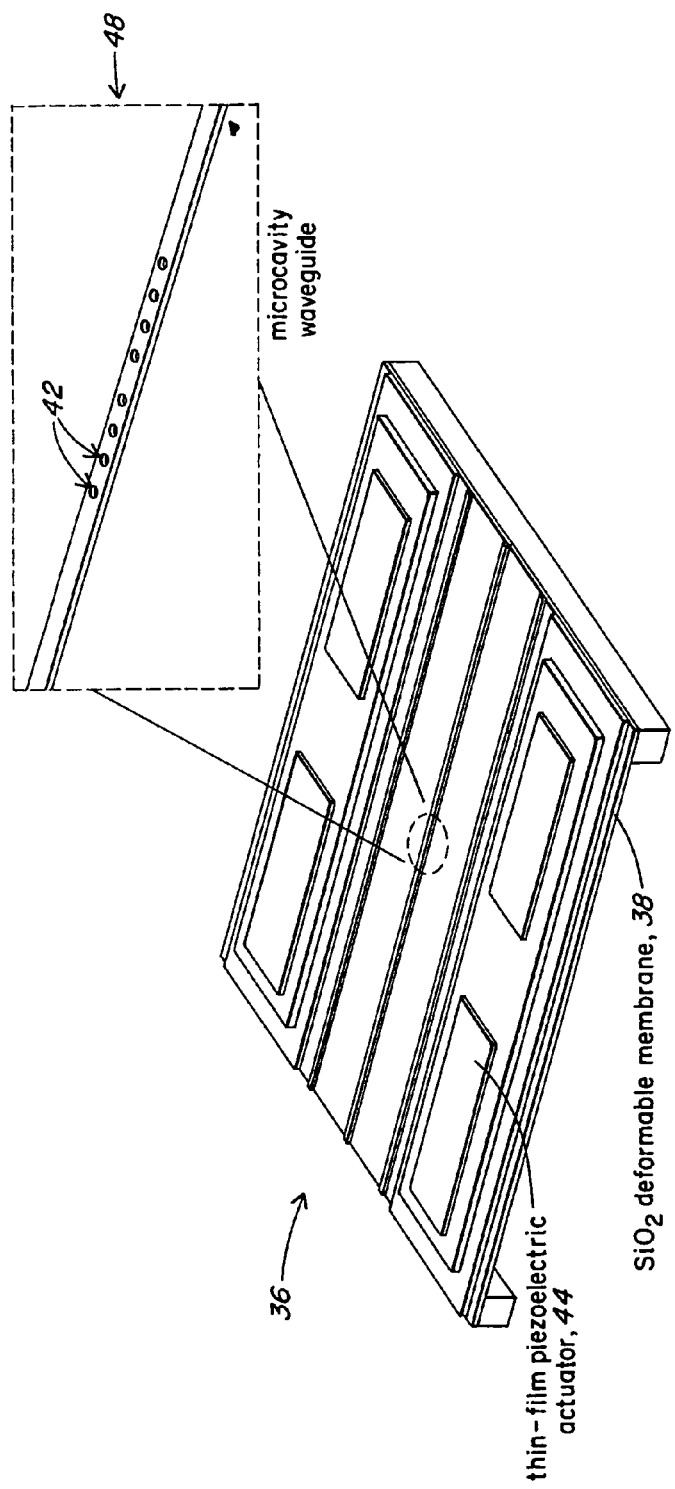
FIG. 4 is a schematic diagram of a microcavity waveguide implemented on top of a membrane.

In another embodiment of the invention, a microphotonic structure includes a microcavity waveguide 40 that is formed on top of membrane 38, as shown in FIG. 4. This waveguide 40 is a 1-D photonic crystal, with optical confinement in the other two directions through total internal reflection from the high dielectric contrast in the silicon waveguide. By mechanically-straining the membrane with piezoelectric actuators 44, the defect length over the lattice constant ratio can be increased. Based on design analysis and demonstrated experimental work, a strain of 0.1% to 0.2% can be applied at the microcavity and a strain of 0.2% to 0.3% at the holes 42 in the waveguide. A mechanical strain of 0.3% on the microcavity waveguide will result in approximately 0.85% tunability in the resonant frequency in the bandgap, as calculated through perturbation to finite-difference time-domain computations. The specific amount of tuning in the periodicity could be increased and decreased in specific designs.

Figure 5:
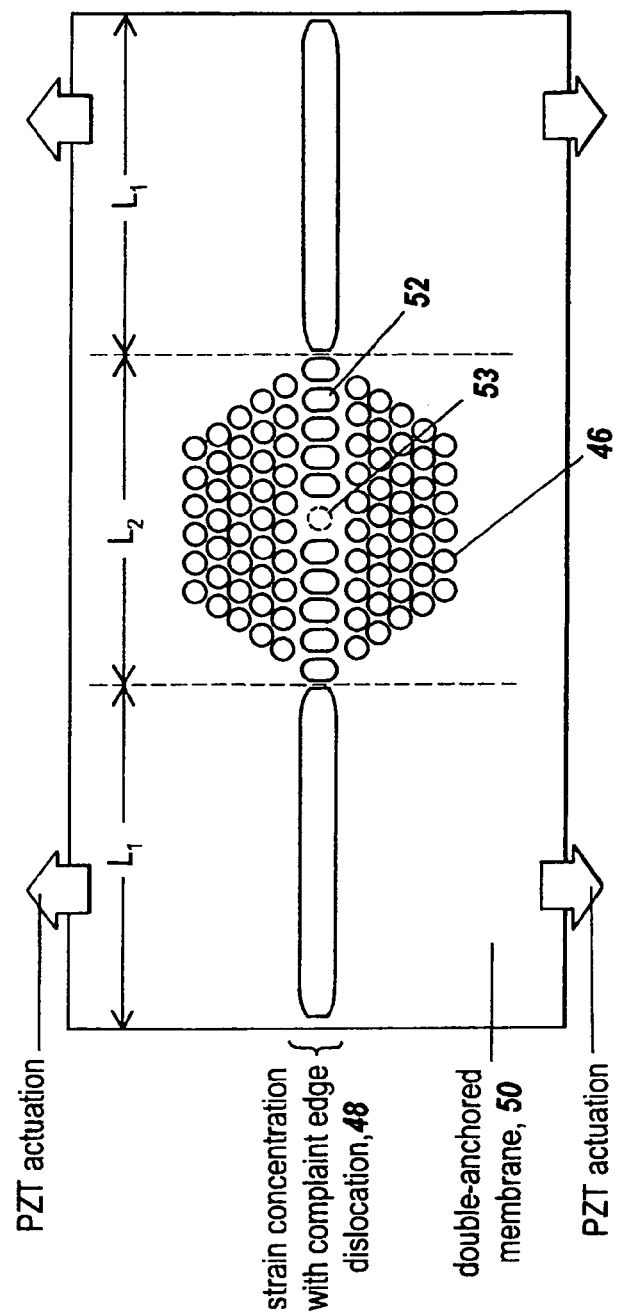
FIG. 5 is a schematic diagram of a 2-dimensional photonic crystal implemented on top of a membrane with 1-dimensional tunability.

In another embodiment of the invention, tuning of fractional edge dislocations 52 for 1-dimensional deformation of a 2-dimensional photonic crystal 46, such as a hexagonal 2-dimensional photonic crystal with a line defect 52, is shown in FIG. 5. The strain can be concentrated at the fractional edge region 48 through sharp width tapering of the membrane 50 at the fractional edge region 48, leading to significant mechanical strain at the localized region. The removal of membrane material along the line defect permits localized strain at the fractional edge region 48. By tuning the localized period in this example photonic crystal 46, the Q factor of the localized mode from defect 53 of the photonic crystal 46 can be increased. Furthermore, FIG. 5 shows that the photonic crystal 46 has a length of $L_2$ and the length of the fraction edge region 48 is $L_1$. Note that the PZT actuation is used in operation of this structure.

The inventive microphotonic structure can be used in optical circuits and optical communications, such as tunable vertical 2-dimensional photonic band-gap defect laser. Moreover, the inventive microphotonic structure can be used in light modulation for optical displays and optical storage devices. Furthermore, the inventive microphotonic structure can be used in experiments in cavity quantum electrodynamics.

Although the present invention has been shown and described with respect to several preferred embodiments thereof, various changes, omissions and additions to the form and detail thereof, may be made therein, without departing from the spirit and scope of the invention.

What is claimed is:

1. A microphotonic device comprising:
   a deformable membrane structure that can experience strain using a plurality of thin-film actuators that is directly formed on said deformable membrane, said strain is continuous in the strain direction, said deformable membrane provides mechanical support for said microphotonic device while providing high dielectric contrast relative to air underneath said deformable membrane; and
   a waveguide element formed on said deformable membrane structure so that when said deformable membrane structure is strained, said waveguide element is tuned to a selective amount.

2. The microphotonic device of claim 1, wherein said deformable membrane structure comprises a sub-micron $SiO_2$ layer.

3. The microphotonic device of claim 1, wherein said waveguide element comprises a microring resonator.

4. The microphotonic device of claim 1, wherein said waveguide element comprises a microracetrack resonator.

5. The microphotonic device of claim 1, wherein said waveguide element comprises a 1-dimensional photonic crystal.

6. The microphotonic device of claim 1, wherein said waveguide element comprises a 2-dimensional photonic crystal.

7. The microphotonic device of claim 5, wherein said 1-dimensional photonic crystal comprises holes.

8. The microphotonic device of claim 7, wherein said selective amount comprises approximately 1%.

9. The microphotonic device of claim 3, wherein said selective amount comprises 0.2%.

10. The microphotonic device of claim 1 further comprising at least one piezoelectric actuator that is coupled to said deformable membrane so as to produce said strain.

11. A method of forming a microphotonic device comprising:
   forming a deformable membrane structure that can experience strain using a plurality of thin-film actuators that is directly formed on said deformable membrane, said strain is continuous in the strain direction, said deformable membrane provides mechanical support for said microphotonic device while providing high dielectric contrast relative to air underneath said deformable membrane; and
   forming a waveguide element on said deformable membrane structure so that when said deformable membrane structure is strained said waveguide element is tuned to a selective amount.

12. The method of claim 11, wherein said deformable membrane structure comprises a sub-micron $SiO_2$ layer.

13. The method of claim 11, wherein said waveguide element comprises a microring resonator.

14. The method of claim 11, wherein said waveguide element comprises a microracetrack resonator.

15. The method of claim 11, wherein said waveguide element comprises a 1-dimensional photonic crystal.

16. The method of claim 11, wherein said waveguide element comprises a 2-dimensional photonic crystal.

17. The method of claim 15, wherein said 1-dimensional photonic crystal comprises holes.

18. The method of claim 17, wherein said selective amount comprises approximately 1%.

19. The method of claim 13, wherein said selective amount comprises 0.2%.

20. The method of claim 11 further comprising providing at least one piezoelectric actuator that is coupled to said deformable membrane so as to produce said strain.

* * * * *